Patented Jan. 5, 1943

2,307,037

UNITED STATES PATENT OFFICE 2,307,037

PROCESS FOR PLASTICIZING SYNTHETIC RUBBERLIKE MATERIALS

Walter Gumlich, Leverkusen-Schlebusch, and Erich Konrad, Leverkusen-I. G. Werk, Germany, assignors, by mesne assignments, to Jasco Incorporated, a corporation of Louisiana No Drawing. Application November 5, 1938, Serial No. 239,176. In Germany November 11, 1937

6 Claims. (Cl. 260—23)

The present invention relates to an improvement of the process described and claimed in the earlier co-pending application Serial No. 196,903, filed March 19, 1938, of Albert Koch et al.

As is described and claimed in the said earlier copending application the synthetic rubber-like materials prepared by the emulsion polymerization of butadiene-1.3 hydrocarbons are rendered more plastic by exposing the same at an elevated temperature to an oxidizing treatment in the presence of anti-oxidants. The temperature to be employed according to the said process is above about 80° C.

It has now been found that certain auxiliary agents which may be defined as organic compounds which contain at least one C=C double linkage in the molecule and are capable of taking up oxygen without being split up thereby into smaller molecules and are liquid and nonvolatile under the conditions of working, exert an accelerating effect upon the course of the plasticizing process of the said earlier application. The plasticizing process, if performed in the presence of such auxiliary agents, can be performed either at a lower temperature or more quickly than it was heretofore possible. In consequence thereof, the present invention allows one to subject to the said oxidizing treatment also the latex-like emulsions of butadiene polymerizates which are obtainable according to the emulsion polymerization process, as is more fully described in the examples. The present invention is operative in all cases of emulsion polymerizates of butadiene-1.3 hydrocarbons showing an insufficient plasticity in the heat. The term "butadiene-1.3 hydrocarbon emulsion polymerizate" is intended to include also the polymerizates or homologues of butadiene such as isoprene or dimethylbutadiene as well as products of the conjoint polymerization of butadienes and other polymerizable compounds such as styrene and acrylic or methacrylic acid nitrile. Examples for suitable anti-oxidants are aromatic amines such as alkyl or arylnaphthylamines, alkyl or aryl amino-anthracenes, aldol-α-naphthylamines, diaryl-phenylene diamines, furthermore alkylated phenols and the sulfides or polysulfides thereof (confer the co-pending application Serial No. 181,604, filed December 24, 1937, of Hagen, Dennstedt and Becker, now U. S. Patent 2,175,082, dated October 3, 1939). Preferred anti-oxidants for the working according to the present invention are aromatic hydroxy compounds such as chlorinated phenols, tetrahydronaphthol and the products which are obtainable by causing acid catalysts to react upon aromatic vinyl compounds and aromatic hydroxy compounds (confer the co-pending application Serial No. 125,434, filed February 12, 1937, of Rosenthal and Meis, now U. S. Patent 2,224,837, dated December 10, 1940). These anti-oxidants are preferably employed in an amount of up to about 4% calculated on the amount of polymerizate. Depending on the nature and the amount of the antioxidants the temperature may vary within wide limits.

Amongst the new auxiliary agents of the character described there are preferably employed unsaturated higher fatty acids such as the acids obtained by saponification of linseed or wood oil. Other unsaturated compounds which have proved to be suitable for the purpose in question are isododecylene or the products of the conjoint polymerization in the presence of acid reacting catalyst of butadienes-1.3 and isododecylene or propylene. The new auxiliary agents are effective even if employed in a very small proportion of for instance, 0.5 to about 3% calculated on the amount of the polymerized products.

The following examples illustrate the present invention without, however, restricting it thereto, the parts being by weight:

Example 1

Within 500 parts of a synthetic rubber-like material (obtained from the emulsion polymerization of about 75 parts of butadiene and about 25 parts of styrene with subsequent precipitation) which contains 3 parts of phenyl-β-naphthylamine, there are incorporated on the roller 20 parts of a mixture of equal parts of isododecylene and tetrahydronaphthol. The mixture is then heated in the presence of air for 48 hours to 70°. The product thus obtained shows a considerably improved plasticity when compared with the raw product which has not been subjected to the said aftertreatment, the mechanical properties of the vulcanizates prepared therefrom such as tensile strength and elasticity being unchanged, the elongation being increased.

Example 2

In the product of Example 1 the auxiliary agents are replaced by a mixture of equal parts of tetrahydronaphthol and the mixed polymerizate of butadiene and propylene (prepared by the action of aluminium chloride). The heating is performed as described in the preceding example. The resulting product shows a still improved workability when compared with the product of Example 1; the remaining mechanical properties are by no means impaired, the elongation being even increased.

Example 3

Within a latex (prepared from the emulsion polymerization of 75 parts of butadiene and about 25 parts of styrene) there is incorporated a mixture of equal parts of the polymerization product of styrene and phenol (obtainable according to application Serial No. 125,434 to Leo Rosenthal et al.) on the one hand, and of the mixed polymerizate of butadiene and propylene on the other hand, 4% of this mixture (calculated on the amount of rubber) being employed. After coagulation the product is worked up as described in Examples 1 and 2. It shows a considerably improved workability when compared with the product prepared without the said additions. Also these vulcanizates show an increased elongation, the other mechanical properties being by no means impaired. The same effect is reached when employing instead of the polymerization product of styrene and phenol 2% of trichlorophenol (calculated on the amount of rubber).

Example 4

Within a latex (prepared from 75 parts of butadiene and 25 parts of acrylic acid nitrile) there are incorporated 3 parts of dibutylphenolsulfide, 1.5 parts of linoleic acid or wood oil acid and 1 part of the polymerization product obtainable from styrene and phenol. After coagulation and drying in the usual manner the polymeric product can be converted into a highly plastic easily workable product by a short heating to 120°.

We claim:

1. In the process of plasticizing synthetic rubber like materials prepared by the emulsion polymerization of polymerizable substances selected from the group consisting of butadiene-1.3 hydrocarbons and mixtures of butadiene-1.3 hydrocarbons with styrene, acrylic acid nitrile and methacrylic acid nitrile by exposing said materials at an elevated temperature to an oxidizing treatment in the presence of up to about 4% based on the polymerizate of an antioxidant, the step which comprises homogeneously incorporating within the rubber like material prior to the oxidizing treatment an unsaturated drying oil fatty acid.

2. In the process of plasticizing a synthetic rubber like material prepared by the emulsion polymerization of a mixture of butadiene-1.3 and styrene by exposing said material at elevated temperatures to an oxidizing treatment in the presence of up to about 4% based upon the polymerization product of an antioxidant, the step which comprises homogeneously incorporating within the rubber like material prior to the oxidizing treatment an unsaturated drying oil fatty acid.

3. The process as defined in claim 1 wherein the drying oil fatty acid is linoleic acid.

4. The process as defined in claim 2 wherein the drying oil fatty acid is linoleic acid.

5. The process as defined in claim 1 wherein the drying oil fatty acid used is linoleic acid which is used in amounts of from about 0.5% to about 3% calculated on the amount of polymerized products.

6. The process as defined in claim 2 wherein the drying oil fatty acid used is linoleic acid which is used in amounts of from about 0.5% to about 3% calculated on the amount of polymerized products.

WALTER GUMLICH.
ERICH KONRAD.